United States Patent [19]

Wallgren

[11] Patent Number: 4,697,729
[45] Date of Patent: * Oct. 6, 1987

[54] TIP FOR REMOVING COMPONENTS FROM A SUBSTRATE

[75] Inventor: Linus E. Wallgren, Rockville, Md.

[73] Assignee: Pace Incorporated, Laurel, Md.

[*] Notice: The portion of the term of this patent subsequent to May 19, 2004 has been disclaimed.

[21] Appl. No.: 756,692

[22] Filed: Jul. 19, 1985

Related U.S. Application Data

[63] Continuation-in-part of Ser. No. 636,267, Jul. 31, 1984, abandoned.

[51] Int. Cl.$^4$ .............................................. B23K 3/04
[52] U.S. Cl. ........................................ 228/20; 228/51
[58] Field of Search ............... 228/19, 20, 119, 264, 228/51, 52, 53, 55; 219/221, 227, 228, 230, 238; 29/764; D8/30

[56] References Cited

U.S. PATENT DOCUMENTS

| | | | |
|---|---|---|---|
| 2,955,187 | 10/1960 | Campo | 228/20 |
| 3,084,649 | 4/1963 | Parstorfer | 219/230 |
| 3,382,564 | 5/1968 | Gallentine | 219/230 |
| 3,529,760 | 9/1970 | Hickman et al. | 228/51 |
| 3,813,023 | 5/1974 | Auray et al. | 228/19 |
| 3,896,533 | 7/1975 | Ullman et al. | 29/764 |
| 4,269,343 | 5/1981 | Siegel et al. | 228/20 |
| 4,528,746 | 7/1985 | Yoshimura | 228/264 |

Primary Examiner—M. Jordan
Attorney, Agent, or Firm—Gerald J. Ferguson, Jr.; Michael P. Hoffman; Ronni S. Malamud

[57] ABSTRACT

A replaceable tip for a hand-held pencil-like solder extractor for removing electronic components from a substrate. The tip comprises a tubular member having a first linear section of predetermined length with a first end coaxially receivable within a passageway in a solder extractor, a second linear section of predetermined length and having a free end, and a detent means intermediate the first and second sections for limiting the length of the tubular member received within the solder extractor passageway and for maintaining the free end of the tubular member a fixed distance from the solder extractor. The first and second linear sections each have a respective axis, and the axis of the first section forms an angle with the axis of the second section. A component removal head is connected to the free end of the tubular member, and the head has at least two heatable spaced-apart shoulders for contacting the lead connections of a component to melt the solder at the lead connections, and a suction means connected to the central bore for holding a component between the shoulders upon the application of suction through the central bore to thereby facilitate removal of the component from the substrate upon melting of the solder of the lead connections.

15 Claims, 8 Drawing Figures

TIP FOR REMOVING COMPONENTS FROM A SUBSTRATE

The present application is a continuation-in-part application of co-pending application Ser. No. 636,267, filed July 31, 1984 now abandoned.

BACKGROUND OF THE INVENTION

1. Field of the Invention

The present invention relates to removal of electronic components from printed circuit boards. More particularly, the present invention is directed to an improved replaceable tip suitable for use with a solder extractor for removing electronic components from a printed circuit board.

2. Related Application

3. Description of the Prior Art

Repair of electronic equipment often involves the need to remove solder fillets, joints and/or electronic components efficiently without otherwise affecting the circuit as a whole or the other components in the circuit. With respect to solder removal, generally speaking solder extraction is done by applying the front end of a heated tubular element to a soldered area to melt the solder, followed by the application of suction to the tubular member in order to draw off the molten solder through the tube and into a reservoir. U.S. Pat. No. 3,392,897 to Siegel discloses a solder extractor comprising a co-axial instrument of pencil-type construction in which a tubular heated tip, a heat generating element, a molten solder receiving chamber, and a gripping handle are all disposed concentrically and/or in axial succession one to another, with an axial passageway front to rear for the flow of extracted solder. This coaxial pencil-like construction is taught to have a number of advantages in solder removal, namely that this molten solder moves in a straight line, thereby avoiding the possibility of blockage or wear at bend regions and providing a good suction effect from the vacuum source, that the solder extractor as a whole is light and well-balanced, a pencil-like grip permitting close, accurate control of the heated tip with less danger of burn damage to the circuit and components at areas near the solder being removed, that the solder extractor can be readily applied to work pieces that have nearby encumbrances such as upstanding circuit components, and that the radiation and convection heating effects on the work piece are minimized. However, such prior art solder extractors utilize a straight tubular tip, which when utilized in a pencil-like grip, acts to cause molten solder to be drawn substantially parallel to the work piece surface, e.g. the surface of a printed circuit board. This drawing of a solder along the surface of the work piece may be disadvantageous, especially in the case of a circuit board having intricate and/or closely spaced circuits. Alternatively, the tubular tip may be held substantially perpendicular to the circuit board, to desirably draw the molten solder upward and away from the board, but this hand position produces operator fatigue and loss of stability. Moreover, since the tubular tip of the prior art is held in place by a set screw disposed in the solder extractor for this purpose, replacement of the tip, when it becomes worn or fouled with solder can result in the mis-positioning of the tip, causing fluctuations in the length of the projection of the tip from the body of the solder extractor. Such fluctuations can alter heating rates and cause lowered temperatures, if the tip projects too far from the solder extractor, or can cause undesired radiation and convective heating effects on the work piece, due to the solder extractor heating element, when the tip does not project sufficiently from the solder extractor.

In the area of component removal, generally this has been achieved in the past by heating the leads of the component with a heated device to melt the solder at the lead connections to thereby facilitate removal of the component from the board, either by mechanical means, such as with tweezers, or by the use of a blower for blowing the solder from the lead connections, or by use of a vacuum means for attaching the component to the tool.

A yet further way for removing components from a printed circuit board is described in U.S. Pat. No. 4,436,242 which discloses a desoldering device formed with a recess having a box-like configuration which is adapted to closely fit over a leadless component mounted on the circuit board. The box-like recess completely surrounds the component to be removed, and the device operates, not by the use of vacuum, but by molecular attraction of the solder to the component in the recess in order to secure the component within the recess as it is lifted from the board. The component is then removed from the recess by a blast of air through the central passageway extending through the tool.

U.S. Pat. No. 3,382,564 discloses a complex apparatus for soldering and desoldering components on printed circuit boards. Vacuum is utilized for removing the component once the solder has been melted, but desoldering is achieved by a complicated arrangement whereby heated fingers are slidably moved in a vertical direction into and out of contact with the leads of the component.

The prior art component removal devices, such as described above, suffer from the disadvantages that they are cumbersome and expensive. In addition, there are many instances where a repairman of electronic devices must both desolder and solder various connections in the circuitry being repaired, and there is a need to reduce the number of tools required to effect such repairs. For example, a home TV repairman would preferably effect the required repairs with a single tool which can be readily manipulated manually and can be easily adapted using interchangeable components for effecting different functions.

SUMMARY OF THE INVENTION

It is an object of the present invention to provide a replaceable tip for a hand-held pencil-like solder extractor which will remove solder from the work piece in a direction substantially perpendicular to the work piece while allowing the operator to grasp the solder extractor in a pencil-like manner, the grasping hand being supported by the work piece or work table, as in writing with a pencil, for stability and comfort.

It is a further object of the present invention to provide a replaceable tip for a solder extractor which can be reliably positioned to maintain a predetermined projection from the solder extractor body.

It is a yet further object of the present invention to provide a replaceable tip for a hand-held pencil-like solder extractor for removing electronic components from a substrate in a direction substantially perpendicular to the work piece, while allowing the operator to grasp the solder extractor in a pencil-like manner, with the grasping hand being supported by the work piece or work table, as in writing with a pencil, for stability and comfort.

According to one aspect of the present invention, there is provided a replaceable tip for a hand-held pencil-like solder extractor having an axis and a coaxial passageway for removing solder from a planar surface. The tip comprises a tubular member of predetermined outside diameter having a central bore of substantially constant cross-section. The tubular member comprises a first linear section of predetermined length having an axis, which is co-axially receivable in the passageway of the solder extractor, a second linear section of predetermined length having an axis and a free end, which is used for contacting solder, and a detent section intermediate the first and second sections for limiting the length of the tubular member which is received within the solder extractor passageway and maintaining the free end of the second section at a fixed distance from the solder extractor. The axis of the second section forms an angle with the axis of the first section such that when the solder extractor is grasped by an operator in a pencil-like manner, the axis of the second section is substantially perpendicular to the planar surface from which solder is to be removed, and thus molten solder will be drawn into the hollow tube away from the work piece surface.

According to a further embodiment, the present invention provides a replaceable tip for a hand-held pencil-like solder extractor for removing electronic components from a substrate. The tip comprises a tubular member having a central bore of substantially constant cross-section, with a tubular member comprising a first linear section of predetermined length having an axis, with the first linear section having a first end co-axially receivable within a passageway in the solder extractor. The tubular member comprises a second linear section of predetermined length having an axis, and a second end, and a detent means is provided intermediate the first and second sections for limiting the length of the tubular member received within the solder extractor passageway, and for maintaining the second end a fixed distance from the solder extractor. The axis of the first section forms an angle with the axis of the second section. A component removal head is connected to the second end, and the head comprises at least two heatable spaced-apart shoulders. The component being removed from the circuit board is receivable between the spaced-apart shoulders. The spaced apart shoulders heat lead connections of the component to melt the solder at the lead connections, and a suction means is provided connected to the central bore for holding the component between the shoulders upon the application of suction through the central bore. In this way, removal of the component from the substrate is facilitated upon melting of solder at the lead connections.

BRIEF DESCRIPTION OF THE DRAWINGS

The invention will now be described in more detail with reference to the accompanying drawings, in which.

DETAILED DESCRIPTION OF THE INVENTION

Hand-held pencil-like solder extractors are known in the art. Typically, such solder extractors comprise a replaceable tubular heated tip, a heat generating element for supplying heat to the tip, a molten solder receiving chamber and a gripping handle disposed in concentric and/or axial succession one to the other, with an axial passageway front to rear for the flow of extracted solder. In use, the operator applies the hot tip to a solder connection long enough to melt the solder, and then applies a suction which draws the now molten solder off through the tip along the axial passageway, and into the solder receiving chamber. In this regard, U.S. Pat. No. 3,392,897 to Siegel discloses such a conventional solder extractor and the use thereof, and the disclosure of that patent is hereby specifically incorporated by reference.

Figure 1:
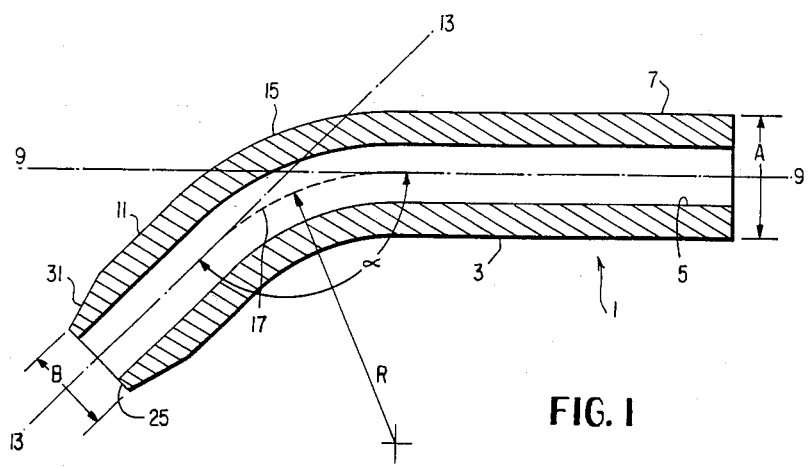
FIG. 1 is a sectional view of a replaceable tip for a solder extractor in accordance with the present invention.
Figure 2:
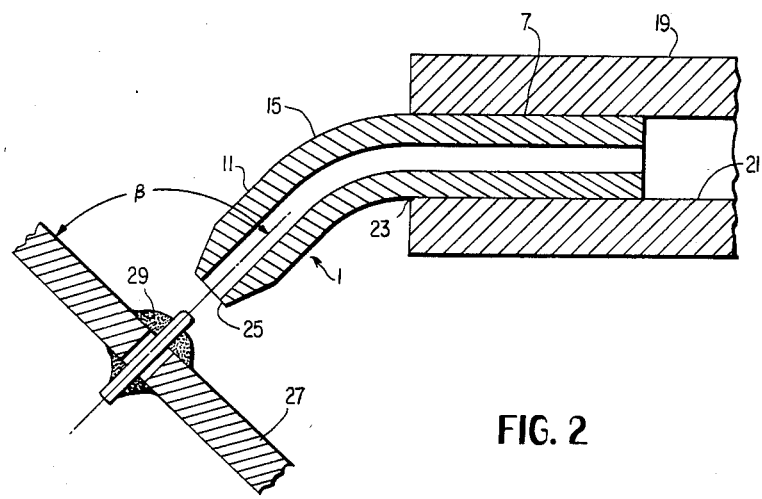
FIG. 2 is a sectional view of a replaceable tip of the present invention in place in a conventional solder extractor.

The embodiments illustrated in FIGS. 1 and 2 will now be described in detail. FIG. 1 illustrates a sectional view of one type of tip according to the present invention. In particular, the tip, generally indicated at 1, comprises a tubular member 3 of predetermined outside diameter, indicated as "A", having central bore 5 of substantially constant cross-section. The tubular member 3 and the central bore 5 are both of substantially circular cross-section. Of course, other cross-sectional shapes can be utilized, such as polygonal cross-sections. However, these shapes are more difficult to manufacture, especially in internal cross-section, and the apices where two sides meet offer locations for solder build-up. Accordingly, a circular cross-section is preferred. The tubular member 3 comprises a first linear section 7 of predetermined length having an axis, indicated by dot-dash line 9—9, a second linear section 11 of predetermined length having an axis, indicated by dot-dash line 13—13, and a transition section 15 intermediate the first linear section 7 and the second linear section 11.

The axis 9—9 of the first linear section 7 forms an angle α with the axis 13—13 of the second linear section 11. The function of this angle will be explained in more detail hereinafter.

In order to ensure the free flow of molten solder through the central bore 5, the transition section 15 is formed as a smooth curve joining the first linear section 7 with the second linear section 11. In this regard, the center line of tubular member 3, comprises the axis 9—9 in the first linear section 7, the axis 13—13 in the second linear section 11 and the dotted line 17 (joining axes 9—9 and 13—13) in the transition section 15. The radius of curvature R in the transition section 15 must produce a smooth curve so as to allow free flow of molten solder therethrough. A smooth curve can be created by a constantly increasing or decreasing radius of curvature or a constant radius of curvature where the first and second linear sections are tangential to the curve at its beginning and end, respectively. For ease of manufacture, a constant radius curve (R=constant) is preferred.

The curved transition section 15 also served as a detent means for limiting the length of the tubular member 3 which is inserted into the solder extractor. As shown in FIG. 2, the tip 1 of the present invention is connected to the heating element 19 of a solder extractor by coaxially inserting the first linear section 7 into an axial passageway 21 of the solder extractor which communicates with a solder receiving chamber and vacuum source (not shown). As the first section 7 is inserted into the heating element 19, the curvature of the transition section 15 will act as an abutment 23 to prevent further insertion. Thus, in replacing tips, an operator need only insert the first linear section 7 into the heater element 19 until it will go no further. The operator can then secure the tip in place as by tightening a set screw (not shown), and be confident that a predetermined length of the tip (in this case the length of the first linear section 7) is in heat conducting contact with the heater element 19. Moreover, the free end 25 of the tip 1 will be maintained a fixed distance from the heating element by virtue of the angle α between the first and second linear sections (7 and 11, respectively), the radius of curvature R of the transition section 15 and the predetermined length of the second linear section 11.

The angle α between the axes 9—9 and 13—13 of the first linear section 7 and the second linear section 11 is selected so that when the tip 1 is inserted into the heating element 19 of the solder extractor, and the solder extractor is manually grasped by the operator in a pencil-like manner, the axis 13—13 of the second linear section 11 will be disposed substantially perpendicular (angle β in FIG. 2 will be about 90°) to the planar surface 27 of a workpiece (e.g., a printed circuit board) having solder 29 thereon. While different operators will have different manners of holding the solder extractor in a pencil-like manner, an angle α of 120°-150° generally will allow comfort and stability while maintaining the angle β at about 90°. Preferably, the angle α is of 130°-135°.

In a preferred embodiment of the present invention, the outside diameter "A" of the tubular member 3 tapers to a smaller diameter "B" over a portion 31 of the length of the second linear section 11 adjacent to the free end 25 of the second linear section. Desirably, this lessened diameter "B" is narrower than the width of the solder 29 (as shown in FIG. 2) to be removed to ensure that all of the solder which is melted will be drawn through the central bore 5 upon application of a vacuum to the central bore.

The replaceable tip of the present invention is generally fashioned of copper or an alloy of high heat conductance. Desirably, the tip is coated with a corrosion-resistant coating, such as a nickel coating by nickel-plating or other techniques well-known in the art, to resist corrosion by the solder.

In a particularly preferred embodiment of the present invention, the tip is formed to a copper tube, one end of which is swaged down to form a taper to the free end of the tip, the tube is then bent to the appropriate angle and then nickel-plated. More particularly, a copper tube of about one-eighth inch outside diameter having a central core of about 0.018 to 0.060 inch internal diameter more or less is utilized. The first linear section is about 1 5/16 inches in length, the second linear section is about 7/16 inch in length and the transition section is a constant radius curve of a radius of about ¼ inch. The taper is formed by swaging down over a length of about 0.32 inch adjacent the free end of the second section. The angle α is about 130°-135°.

Referring now to the embodiemnt illustrated in FIGS. 3 through 7, FIG. 3 is a perspective view of a replaceable tip 30, which has a component removal head 32. The head 32 is generally U-shaped in cross-section, as can be seen from FIG. 4, and is generally fabricated from a suitable conducting material, such as metal. While any suitable metal can be utilized, it is preferred to utilize the alloy Everdure Bronze or Tellurium Copper for good heat transfer and ease of manufacture.

The head 32 comprises a pair of parallel spaced-apart shoulders 34, 36 disposed at right angles to a surface 38 extending along the entire length of the head. The head is connected to a tubular member 40 having a central bore 42 of substantially constant cross-section. As with the replaceable tip described earlier in connection with FIGS. 1 and 2, the tubular member 40 has a central bore 42 of substantially constant cross-section. The tubular member 40 and the central bore 42 are both of substantially circular cross-section, as with the embodiment described in FIGS. 1 and 2. The tubular member 40 comprises a first linear section 44 of predetermined length having an axis indicated by the line 46—46, a second linear section 48 of predetermined length having an axis, indicated by the line 50—50, and a transition section 52 intermediate the first linear section 44 and the second linear section 48. The axis 46—46 of the first linear section 44 forms an angle α with the axis 50—50 of the second linear section 48. As with the embodiment described in FIGS. 1 and 2, the functions of this angle is to ensure that when the tip 30 is inserted into a heating element 54 of a solder extractor, and the solder extractor is manually grasped by an operator in a pencil-line manner, the axis 50—50 of the second linear section 48, and thus of the head 32, will be disposed substantially perpendicular (angle β in FIG. 4 will be about 90°) to a planar surface 56 of a work piece 58 with a component 60 with leads 70 mounted thereon to be removed. As with the embodiment described in FIGS. 1 and 2, while different operators will have different manners of holding the solder extractor in a pencil-like manner, an angle α of about 120°-150° generally will allow comfort and stability while maintaining the angle β at about 90°. Preferably the angle α is about 130° to 135°.

Figure 3:
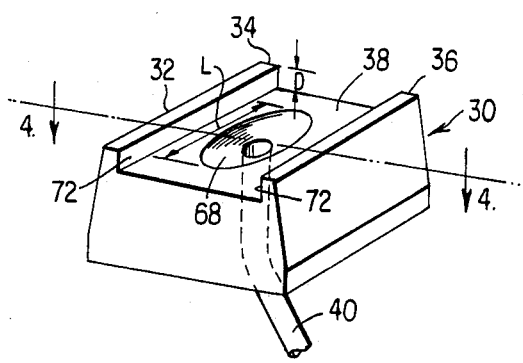
FIG. 3 is a perspective view of a replaceable tip of the invention for use with a solder extractor in removing electronic components from a substrate.
Figure 4:
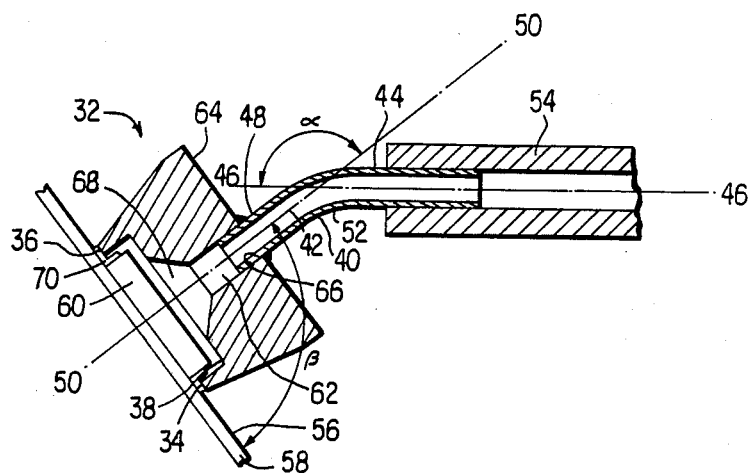
FIG. 4 is a cross-sectional view of the tip of FIG. 3 taken along the line 4—4.

As is clear from FIG. 4, the removal head 32 has a central passageway 62 extending from the surface 38 through to rear surface 64. The head 32 is fixedly mounted to the second linear section 48 at end 66 in order to provide a continuous passageway extending through the central bore 42 into the central passageway 62. A concave portion 68 is formed in the surface 38 surrounding the central passageway 62, and this concave portion may be circular and concentric with the central passageway 62, or may be an elongate oval shape as shown in FIG. 3. The purpose of the concave portion 68 is to facilitate the generation of at least a partial vacuum above the component 60 as a result of leakage of air between the leads 70 of the component 60 and the inner walls 72 of the shoulders 34, 36 upon the application of suction to the central bore 42. In the embodiment illustrated in FIG. 3, the oval concave portion 68 has a length L which is about two to four times the diameter of the central bore 42, and forms a plenum which given rise to an increased suction effect to hold the component 60 between the shoulders 34, 36 and against the surface 38 upon removal from the work piece 58.

The inner walls 72 of the shoulders 34, 36 extend a distance D from the surface 38 such that when the shoulders 34, 36 contact the workpiece or the lead connections 70, the hot surface 38 does not contact the component 60. In addition, the inner surfaces 72 are separated by a distance such that when the shoulders 34, 36 contact the lead connections 70, the inner surfaces 72 do not contact the component 60. In this way, melting of the solder at the lead connections 70 is achieved with minimal heat damage being effected to the component 60 since none of the heated surfaces 38 and, 72 contacts the component during the melting operation.

In FIG. 4, the lead connections 70 are shown as external lead connections or "gull-wing" connections. However, it is to be understood that the replaceable tip 30 may also be used for removing components having leadless connections.

Figure 5:
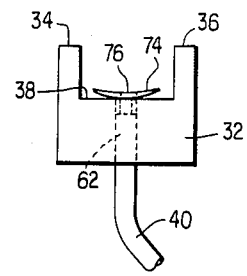
FIG. 5 is an end view of another replaceable tip of the invention for removing electronic components.

FIG. 5 shows an alternative embodiment of a component removal head in which the suction means comprises a compliant suction element 74 fixedly attached to the central passageway 62. The suction element 74 has a passageway 76 extending therethrough and into communication with the central passageway 62. The suction element may be fabricated from any suitable heat resistant flexible material, such as, for example, high temperature silicone rubber. In use, when the component to be removed has been loosened as a result of melting of solder at the lead connections, and suction is applied through the passageway 62, the component is drawn towards the suction element 74 and held against the suction element in order to facilitate removal of the component from the work piece. An advantage associated with the use of the suction element 74 is that the component does not come into direct contact with surface 38, and therefore the risk of heat damage to the component is reduced.

Figure 6:
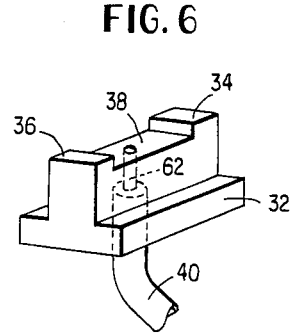
FIG. 6 is a perspective view of a further replaceable tip of the invention for removing electronic components.

FIG. 6 shows an alternative embodiment of a component removal head which is particularly designed for removal of leadless component. In this embodiment, the head is configured for application across the ends of the component not having leads associated therewith, whereby removal is effected by imparting heat to the component itself and melting the solded connections as a result of direct conduction of heat through the component. It will be appreciated that there are instances where it is not intended to reuse a component which is removed, and the component removal head illustrated in FIG. 6 can be used for removal of such components. As will be seen from FIG. 6, the shoulders 34, 36 extend transversely to the longitudinal direction of the head 32. This enables the head to be placed over the component with the shoulders 34, 36 adjacent the sides of the component which do not have leads associated therewith. A central passageway 62 extends from the surface 38 to a source of vacuum (not shown), to facilitate removal of the component after the solder at the lead connection has been melted.

Figure 7:
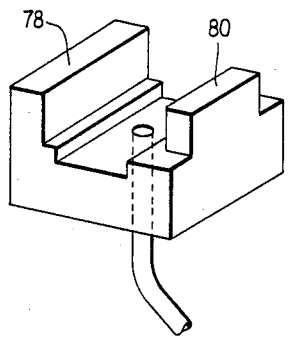
FIGS. 7 and 8 are perspective views of other replaceable tips of the invention for removing electronic components.

FIG. 7 shows an embodiment having shoulders 78, 80 of unequal length. The embodiment illustrated in FIG. 7 is particularly suited for removal of small outline transistors (SOT's) having two leads on one side of the component, and one lead disposed centrally on the other side of the component. However, it will be appreciated that the embodiment illustrated in FIG. 7 may be used for removal of any type of component where the number of leads on one side of the component is not the same as the number on the other side of the component.

Figure 8:
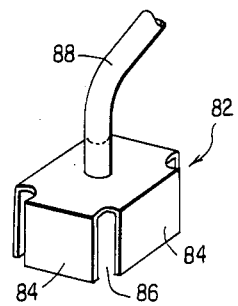

It will be appreciated from the above that the embodiments illustrated in FIGS. 3 through 7 are designated for removing components having lead connections only on two opposed parallel sides of the component. However, there are many types of components having leads on all four sides of the component, and the embodiment illustrated in FIG. 8 is designed for removal of such components. FIG. 8 shows a replaceable tip 82 having four heating members disposed at 90° to each other to form a box-like configuration. Since the leads of a component are disposed only on the sides of the component, and not at the corners of the component, the heating members 84 are not joined at their corners, but instead are arranged so that there are spaces 86 between each of the members of the corners so that the corners of the component are not subjected to heating. The heating members 84 are each connected to a bent tubular member 88 having the same configuration as that of the tubular 40 illustrated in FIG. 4, so that the tip 82 can be readily connected to the heating element 54 of a solder extractor.

I claim:

1. A replaceable tip for a hand-held pencil-like solder extractor for removing electronic components from a substrate, said tip comprising:

a tubular member having a central bore of substantially constant cross-section, said tubular member comprising a first linear section of predetermined length having an axis, said first linear section having a first end coaxially receivable within a tubular heating element passageway in said solder extractor, a second linear section of predetermined length having an axis and a second end, and a detent means intermediate said first and second sections for limiting the length of said tubular member receiving within said solder extractor passageway and maintaining said second end a fixed distance from said solder extractor, said axis of said first section forming an angle with said axis of said second section; and a component removal head connected to said second end, said head having at least two heatable spaced-apart shoulders for heating lead connections of said component to melt solder or the like at said lead connections, said component being receivable between said spaced-apart shoulders, and suction means in communication with said central bore for holding said component between said shoulders upon the application of suction through said central bore, whereby said component can be removed from said substrate upon melting of said solder at said lead connections.

2. A replaceable tip according to claim 1, wherein said component removal head includes a surface extending between said shoulders, and said suction means comprises a central passageway forming an aperture in said surface, said passageway being in communication with said central bore.

3. A replaceable tip according to claim 2, wherein said suction means further comprises a concave portion surrounding said aperture in said surface.

4. A replaceable tip according to claim 3, wherein said aperture is circular, and said concave portion has an elongated oval configuration.

5. A replaceable tip according to claim 2, wherein said suction means is comprised of a flexible concave suction element fixedly attached to said aperture, said suction element having a passage extending therethrough in communication with said tubular member.

6. A replaceable tip according to claim 1, wherein said shoulders are of equal length.

7. A replaceable tip according to claim 1, wherein said shoulders are not of equal length.

8. A replaceable tip according to claim 1, wherein there are two spaced-apart parallel shoulders.

9. A replaceable tip according to claim 1, wherein there are four shoulders disposed at right angles to each other, with said shoulders not being connected at the corners.

10. A replaceable tip according to claim 1, wherein said shoulders extend from said surface by a distance such that said surface does not contact said component when said shoulders are in contact with said work piece.

11. A replaceable tip according to claim 1, wherein said detent means comprises a curved section of said tubular member.

12. A replaceable tip according to claim 11, wherein the curvature of said curved section makes a smooth transition from said second section to said first section whereby extracted solder may freely flow from said second to said first section.

13. A replaceable tip according to claim 12, wherein said curved section is a constant radius curve.

14. A replaceable tip according to claim 1, wherein the angle formed between said axis of said first section and said axis of said second section is about 120°–150°.

15. A replaceable tip according to claim 14, wherein said angle is about 130°–135°.

* * * * *